United States Patent Office
3,049,870
Patented Aug. 21, 1962

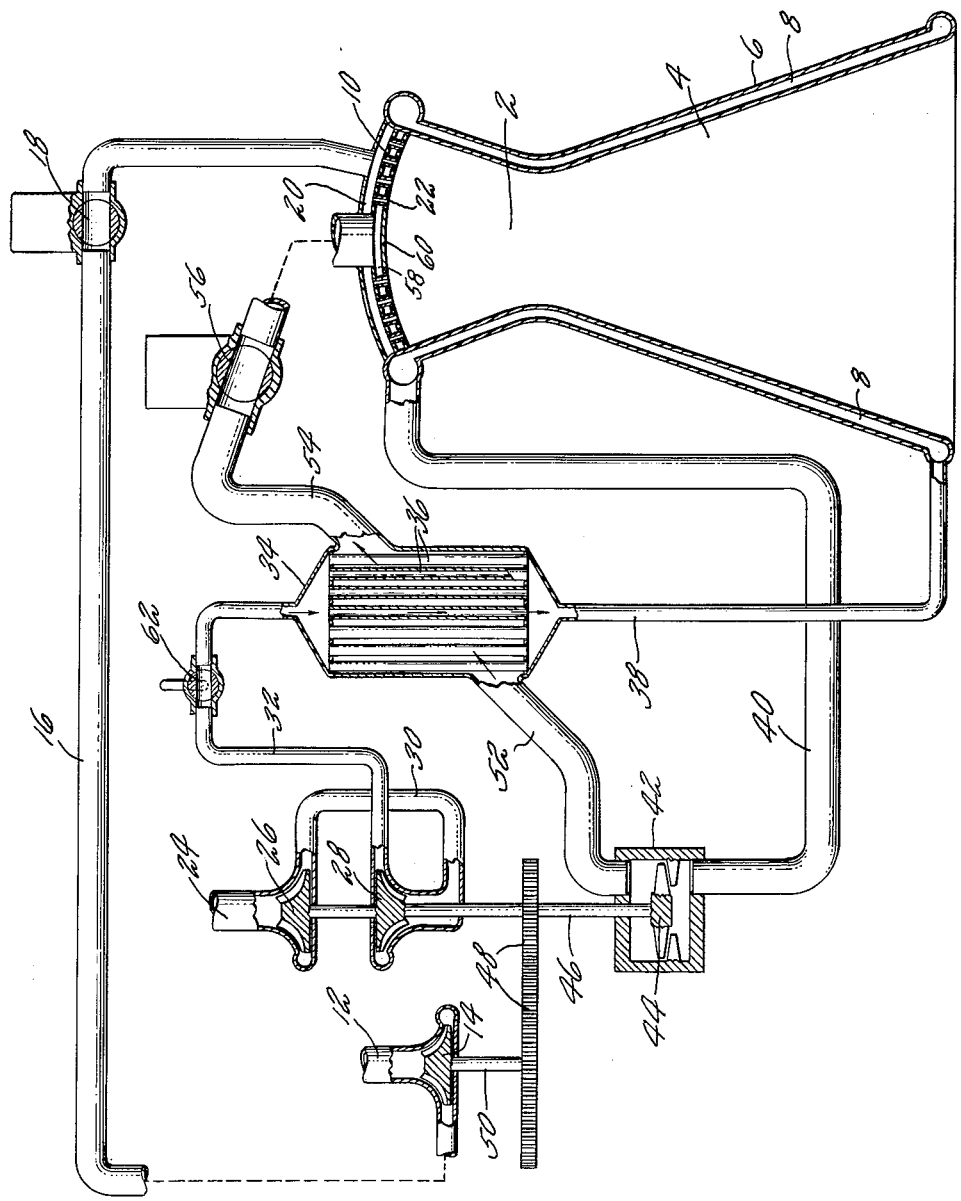

3,049,870
ROCKET PROPELLANT CYCLE
John Chamberlain, Manchester, Conn., assignor to United Aircraft Corporation, East Hartford, Conn., a corporation of Delaware
Filed Apr. 14, 1960, Ser. No. 22,362
11 Claims. (Cl. 60—35.3)

This invention relates to a propellant system for a rocket.

In these systems one of the propellants is generally used as a coolant for the nozzle and is thereby heated. In the propellant pumping system of immediate interest, the heated propellant is used to power a turbine. The turbine drives the pumps for the propellants and the turbine exhaust is discharged into the rocket through an injector. As rocket powers have increased more turbine power has been required to pump the necessary quantities of propellants to high pressures for discharge into the combustion chamber of the rocket through the injector head. One feature of the invention is the additional heating of the propellant within the propellant system before it reaches the turbine in order to provide additional turbine power. The higher temperature of the propellant reaching the turbine provides additional energy for the turbine as turbine power is almost directly proportional to the turbine inlet temperature. Another feature of the invention is the use of the propellant discharging from the turbine for additionally heating the propellant upstream of the turbine.

One feature is the use of a heat exchanger in the propellant system for heating the propellant before it reaches the coolant passages in the nozzle by the use of the propellant discharging from the turbine. By raising the power delivered to the turbine the pumps driven thereby can supply propellants to the injector head at higher pressures thereby permitting increase in the combustion chamber pressure and accordingly, an increase in the available thrust.

Other features and advantages will be apparent from the specification and claims, and from the accompanying drawing which illustrates an embodiment of the invention.

The single FIGURE is a schematic diagram of the propellant system.

The propellant system is shown in connection with a rocket having a combustion chamber 2 and a nozzle 4 communicating therewith, the nozzle and combustion chamber having a cooled wall 6 having passages 8 therein, shown schematically. The rocket also has an injector head 10 forming one wall of the combustion chamber, this head providing for the admission of the propellants into the combustion chamber.

The propellant system will be described with the propellants being an oxidizer and hydrogen although it will be understood that the device is applicable to other propellants. In any event, one of the propellants will be a low boiling point liquid such as liquid hydrogen.

One propellant, the oxidant, is supplied by a conduit 12 to a pump 14 and thence through a conduit 16 past a control valve 18 to the oxidizer manifold 20 in the head. From this manifold the oxidizer is shown schematically as being through ports 22 in the injector head. The pump 14 delivers the oxidizer at a pressure sufficiently above combustion chamber pressure to assure a desired flow of the oxidizer into the combustion chamber.

The other propellant, hydrogen, is delivered by a supply conduit 24 to the first stage pump 26 of a two-stage pump, the high pressure pump 28 being the second stage of the pump. From the low pressure stage 26 the hydrogen is delivered through a conduit 30 to the inlet of the high pressure pump 28 and a conduit 32 delivers hydrogen under pressure from the high pressure pump 28 to a heat exchanger 34, the arrangement being such that the hydrogen passes through a plurality of parallel tubes 36 within the heat exchanger. The heat exchanger is represented only schematically and another type of heat exchanger may well be used. From the heat exchanger a conduit 38 delivers the hydrogen to the passages 8 in the nozzle wall where it is heated in the process of cooling the nozzle wall.

A conduit 40 delivers the hydrogen from the nozzle wall passages to a turbine 42 which has a rotor 44 on the shaft 46 for the pumps 26 and 28. Meshing gears 48 connect the pump shaft 46 to the shaft 50 for the oxidizer pump 14.

The hydrogen exhausting from the turbine discharges through a conduit 52 to the heat exchanger 34 where it flows around the tubes 36 and is then delivered by a conduit 54 past a thrust control valve 56 to the hydrogen manifold 58 in the injector head. From this manifold the hydrogen discharges through a suitable passage in the plate 60 to the combustion chamber.

The valve 18 is normally closed but is open in setting the propellant system in operation. Since the control for this valve is not a part of the invention, it will not be described further. The valve 56 is a thrust control valve and may be of the type shown in the co-pending application of Abild, Serial No. 21,831, filed April 12, 1960. Since this valve is not a feature of the invention, it will not be described in detail.

The hydrogen circulating system may also incorporate a shutoff valve in the conduit 32 to prevent the flow of liquid hydrogen beyond this valve when the system is not operating. When the system is to be put in operation and the valve 18 is open, the valve 62 will permit the liquid hydrogen to flow beyond the valve 62 and into the remainder of the hydrogen system. A more complete fuel system is described in greater detail in the above-identified co-pending application of Abild, Serial No. 21,831.

With the present propellant system, when the rocket is operating, the hydrogen discharging from the turbine is much hotter than the hydrogen entering the heat exchanger so that a substantial amount of heat is added to the hydrogen as it passes through the heat exchanger and reaches the nozzle wall through the conduit 38. As the hydrogen functions to cool the nozzle wall, the temperature of the hydrogen is further increased so that the hydrogen flowing through conduit 40 to the turbine is at a much higher temperature than would be the case if the heat exchanger were not provided. Because of the much higher hydrogen temperature, there is more energy available for the turbine so that more propellants may be delivered to the combustion chamber at a higher pressure, increasing the thrust available for the rocket.

The hydrogen discharging from the turbine as it passes through conduit 52 is still at a substantially higher temperature than the hydrogen from the pumps so that the hydrogen will continue to be heated before it reaches the nozzle wall. It will be understood that the nozzle wall during rocket operation is at such a temperature that the increased temperature of the hydrogen entering the nozzle wall from the heat exchanger is generally insignificant compared to the temperature difference between the hydrogen entering the wall cooling passages and the wall itself.

It is to be understood that the invention is not limited to the specific embodiment herein illustrated and described but may be used in other ways without departure from its spirit as defined by the following claims.

I claim:
1. In the operation of a liquid fuel rocket having an injector head and a nozzle wall and using a low boiling point fuel and in which that fuel is used to cool the nozzle wall and is thereby heated to supply energy to a turbine, the steps of heating the fuel before it is used for cooling the nozzle wall so that the fuel will be additionally heated by nozzle wall cooling and is accordingly hotter when it reaches the turbine and a further step of using the fuel exhausting from the turbine for heating the fuel before it reaches the nozzle wall for cooling it.

2. The operation as in claim 1 in which there is the further step of delivering the exhaust fuel to the injector head for the rocket after it leaves the turbine and has been used to heat the fuel.

3. In a propellant supply system for a rocket having an injector head and propellant heating means associated therewith, a pump for delivering a propellant to said heating means, a turbine driving said pump, a duct from said pump to the heating means, a conduit from said heating means to said turbine, a conduit from the turbine to the injector head and a heat exchanger in the conduit from the turbine to the injector and in the duct to heat the propellant from the pump and to cool the propellant from the turbine.

4. A propellant supply system as in claim 3 in which a shutoff valve is provided between the pump and the heat exchanger.

5. A propellant supply system as in claim 3 in which the propellant is a low boiling point liquid.

6. In a fuel supply system for a liquid fuel rocket having an injector head and coolant passages in the wall thereof, a conduit for delivering propellant under pressure to the cooled wall passages, a turbine, a conduit from said passages to the turbine to supply heated propellant to the turbine, a conduit from said turbine to the injector head for delivering propellant to the head and means for adding heat to the propellant before it reaches the passages, the added heat being supplied from the propellant between the turbine and the injector head.

7. A system as in claim 6 in which the means is a heat exchanger in the conduit to the passages and the conduit to the injector head.

8. A supply system as in claim 6 in which the propellant is a low boiling point liquid.

9. A system as in claim 6 in which the turbine drives a pump by which propellant under pressure is supplied to the first conduit.

10. In a propellant supply system for a rocket having an injector head and propellant heating means associated therewith, a pump for delivering a propellant to said heating means, a turbine driving said pump, a duct from said pump to the heating means, a conduit from said heating means to said turbine, a turbine discharge conduit and a heat exchanger in the duct and in the discharge conduit for heating the propellant in the duct by the heated propellant in said discharge conduit.

11. A propellant supply system as in claim 10 in which the propellant is a low boiling point fuel.

References Cited in the file of this patent
UNITED STATES PATENTS

| | | |
|---|---|---|
| 2,483,045 | Harby | Sept. 27, 1949 |
| 2,586,025 | Godfrey | Feb. 19, 1952 |
| 2,704,438 | Sheets | Mar. 22, 1955 |
| 2,785,532 | Kretschmer | Mar. 19, 1957 |